P. H. BREED.
BRAKE.
APPLICATION FILED MAY 9, 1910. RENEWED FEB. 24, 1912.
1,046,256.
Patented Dec. 3, 1912.
2 SHEETS—SHEET 1.
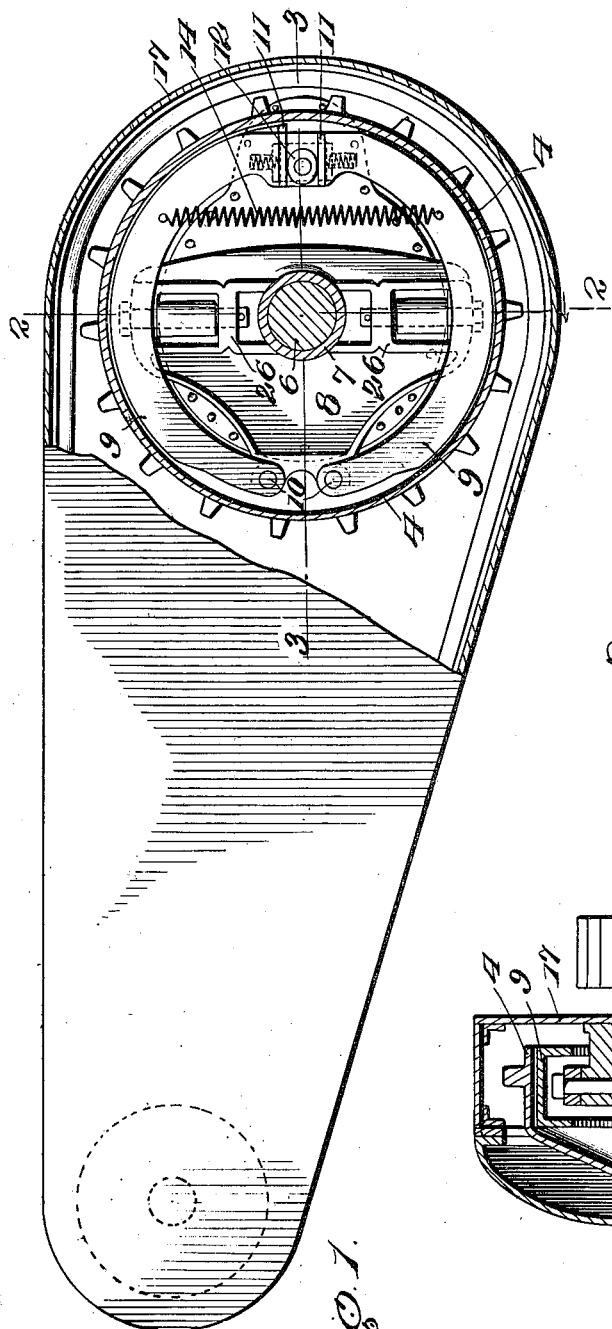
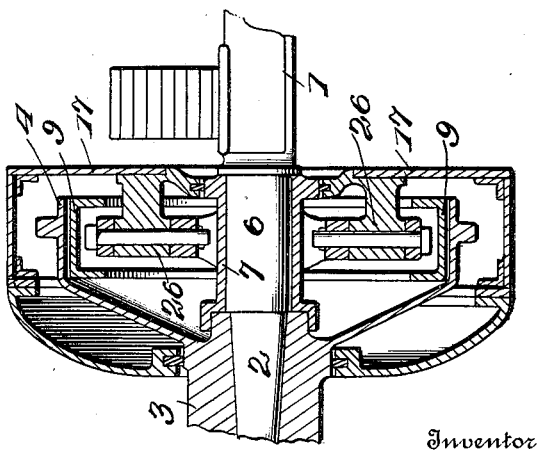
Witnesses
W. A. Williams
S. L. Burket
Inventor
P. H. Breed,
By A. S. Pattison,
Attorney P. H. BREED.
BRAKE.
APPLICATION FILED MAY 9, 1910. RENEWED FEB. 24, 1912.
1,046,256.
Patented Dec. 3, 1912.
2 SHEETS—SHEET 2.
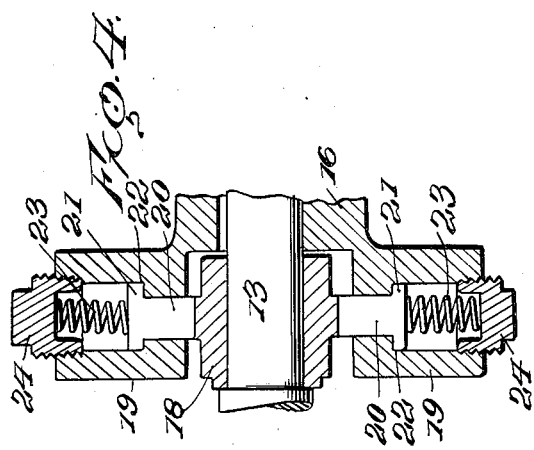
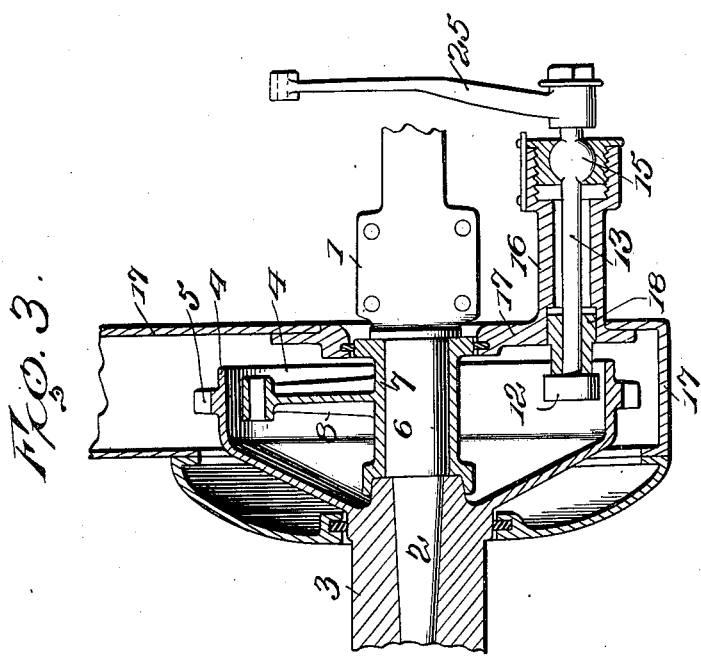

UNITED STATES PATENT OFFICE.

PRESTON H. BREED, OF PITTSFIELD, MASSACHUSETTS, ASSIGNOR, BY MESNE ASSIGNMENTS, TO ALDEN SAMPSON MANUFACTURING COMPANY, A CORPORATION OF NEW JERSEY.

BRAKE.

1,046,256. Specification of Letters Patent. Patented Dec. 3, 1912.

Original application filed September 1, 1909, Serial No. 515,650. Renewed July 13, 1911, Serial No. 638,396. Divided and this application filed May 9, 1910, Serial No. 560,224. Renewed February 24, 1912. Serial No. 679,768.

*To all whom it may concern:*

Be it known that I, PRESTON H. BREED, a citizen of the United States, residing at Pittsfield, in the county of Berkshire and State of Massachusetts, have invented certain new and useful Improvements in Brakes, of which the following is a specification, reference being had therein to the accompanying drawing.

This invention relates to brakes for vehicles and is of special utility in self-propelled vehicles. The invention has reference more particularly to the construction of the mechanism for operating braking members.

The object of the present invention is to provide an operating mechanism for applying the brake, which will equalize the braking effect or friction of the brake shoes against the brake drum.

This application is a division of an application filed by me September 1st, 1909, Serial No. 515650 and renewed July 13, 1911, Serial No. 638,396.

In the accompanying drawings—Figure 1 is a side elevation of a brake which embodies my invention, the inclosing case being shown in section. Fig. 2 is a vertical section on the line 2—2, of Fig. 1. Fig. 3 is a horizontal section on the line 3—3 of Fig. 1. Fig. 4 is an enlarged vertical sectional view of the equalizing mechanism.

Referring now to the accompanying drawings, 1 is an axle which is provided with a suitable wheel spindle 2, upon which the hub 3 of a wheel (not shown) is suitably journaled. Attached in any suitable manner to this hub 3, is an inwardly projecting brake drum 4. In the form here shown a driving sprocket 5 is carried on the outer periphery of this drum 4, but the manner of driving the wheel 3 forms no part of the present improvement.

Placed on the portion 6, of the axle 1, is a sleeve 7, and this sleeve is provided with a projecting arm 8 to which one end of the brake shoes 9 are pivoted at the points 10. The opposite ends of the brake shoes 9 are provided with cam-bearing surfaces 11, which are engaged by a cam 12 carried on the inner end of a cam-operating shaft 13. A suitable contracting spring 14 has its ends connected to the brake shoes 9 and serves to normally hold the cam-surfaces 11 in engagement with the cam 12. The outer end of the operating shaft 13 has a ball and socket joint bearing 15 in the outer end of a suitable supporting tube or projection 16, which is carried by any desired support. In the manner here shown the tube 16 is attached to the inner wall of a chain case 17, though this may be varied so far as the broad idea of the equalizing feature is concerned.

The inner or cam end of the operating shaft 13 is journaled in a vertically movable block 18. Located above and below the block 18 are outwardly projecting cylinders 19, in which headed plungers 20 move. The inner ends of these plungers 20 engage the block 18 and the outer ends of the plungers have heads 21, which engage shoulders 22 in the cylinders and limit their outward movement. Suitable springs 23 have their inner ends resting upon the heads of the plungers and their outer ends engaging adjustable screw-plugs 24, which enter and close the outer ends of the cylinders 19. Attached to the inner end of the operating shaft 13, is a suitable operating arm 25, by means of which the operating shaft 13 is oscillated. The springs 23 and plungers 20 serve to centralize the operating shaft and its cam 12, and the spring 14 holds the cam surfaces 11 of the brake-shoes in engagement with the cam 12, which centralizes the brake-shoes in respect to the brake drum and prevents them from engaging or dragging against the brake drum when the brake is not applied. When the operating shaft 13 is oscillated to cause the cam to engage the cam surfaces 11, the brake shoes are forced outward against the brake drum 4, and as the cam-carrying shaft 13 is capable of lateral movement, it prevents one shoe from having a greater pressure against the brake drum than the other shoe, *i. e.*, it equalizes the braking friction of the two shoes against the brake drum and prevents any lateral spring on the operating shaft which might occur if the cam end of the shaft were in a rigid bearing. Any uneven wear of the brake shoes is in this way compensated for and the braking friction of the shoes equalized irrespective of any uneven wear of the shoes.

The chain case 17 is here shown connected with the sleeve 7 by a suitable vertical hinge or bearing 26, but this forms no part of the present invention and is made the subject-matter of the parent application herein referred to and need not be further described.

Having thus described my invention, what I claim and desire to secure by Letters Patent is:

1. In a brake, the combination with a brake drum, of brake shoes having adjacent free ends, a rotatable and laterally movable cam-shaft, a cam rigid on the shaft between the free ends of the brake shoes, and means for rotating the said cam shaft.

2. In a brake, the combination of a brake-drum, brake-shoes having adjacent free ends, a rotatable and laterally movable cam shaft, a cam mounted on the shaft between the free ends of the brake-shoes, means for yieldingly positioning said shaft with respect to the lateral movement thereof and means for rotating said shaft, substantially as set forth.

3. In a brake, the combination of a brake-drum, brake-shoes having adjacent free ends, a rotatable cam-shaft, a spherical bearing for said shaft adjacent to one end of the shaft, springs for positioning said shaft laterally acting on said shaft adjacent to the opposite end thereof, a cam mounted on said shaft between the free ends of the brake-shoes and means for rotating said cam-shaft, substantially as set forth.

4. In a brake, the combination of a brake-drum, brake-shoes, a cam-shaft extending parallel with the axis of the drum, a cam mounted on the cam-shaft and between the free ends of the brake-shoes, the cam end of the shaft with the cam thereon being movable laterally, and oppositely arranged, spring-actuated plungers acting upon the cam end of the cam-shaft in a direction transverse to the axis of the cam-shaft, substantially as set forth.

In testimony whereof I hereunto affix my signature in the presence of two witnesses.

PRESTON H. BREED.

Witnesses:
JOHN BARBER,
MILTON B. WARNER.